US012325370B2

(12) United States Patent
Ucar et al.

(10) Patent No.: US 12,325,370 B2
(45) Date of Patent: Jun. 10, 2025

(54) DETERMINING AN IDENTIFICATION OF AN OCCUPANT WITHIN A VEHICLE

(71) Applicant: Toyota Motor Engineering & Manufacturing North America, Inc., Plano, TX (US)

(72) Inventors: Seyhan Ucar, Mountain View, CA (US); Takamasa Higuchi, Mountain View, CA (US); Kentaro Oguchi, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 492 days.

(21) Appl. No.: 17/412,506

(22) Filed: Aug. 26, 2021

(65) Prior Publication Data

US 2023/0066199 A1   Mar. 2, 2023

(51) Int. Cl.
*B60R 16/037* (2006.01)
*B60H 1/00* (2006.01)
(Continued)

(52) U.S. Cl.
CPC ....... *B60R 16/037* (2013.01); *B60H 1/00828* (2013.01); *B60H 1/00835* (2013.01);
(Continued)

(58) Field of Classification Search
CPC .................................................... B60R 16/037
See application file for complete search history.

(56) References Cited

U.S. PATENT DOCUMENTS 9,663,112 B2   5/2017  Abou-Nasr et al.
11,625,233 B2 * 4/2023 Ishikawa ................... G06F 8/65
                                                       717/170
(Continued)

FOREIGN PATENT DOCUMENTS

DE   102004013596 A1    10/2005
DE   102018212877 A1 *   2/2020
(Continued)

OTHER PUBLICATIONS

Hoffman, Connor, Here's How Dog Mode Works on the Tesla Model 3, Car and driver, (https://www.caranddriver.com/news/a29591859/how-tesla-dog-mode-works-model-3/)(Oct. 25, 2019).*
(Continued)

*Primary Examiner* — Jean Paul Cass
(74) *Attorney, Agent, or Firm* — Christopher G. Darrow; Darrow Mustafa P.C

(57) ABSTRACT

A system for determining an identification of an occupant within a vehicle can include a processor, a communications interface, and a memory. The memory can store an information reception module, an identification prediction module, and an actuation module. The information reception module can cause the processor to receive, via the communications interface, from at least one sensor, and at a time when a source of a propulsion force for the vehicle is in an off state, at least one signal having information about at least one detectable characteristic associated with the occupant within the vehicle. The identification prediction module can cause the processor to produce, based on the information, a prediction of the identification of the occupant. The actuation module can cause the processor to cause, in response to a production of the prediction, a setting of a component of the vehicle to have a specific value.

18 Claims, 6 Drawing Sheets

(51) Int. Cl.
| | |
|---|---|
| *B60N 2/00* | (2006.01) |
| *B60N 2/02* | (2006.01) |
| *B60N 2/16* | (2006.01) |
| *B60N 2/20* | (2006.01) |
| *B60R 1/04* | (2006.01) |
| *B60R 1/062* | (2006.01) |
| *B62D 1/181* | (2006.01) |
| *B62D 1/187* | (2006.01) |
| *G06F 18/214* | (2023.01) |
| *G06V 20/59* | (2022.01) |

(52) U.S. Cl.
CPC ....... *B60H 1/00878* (2013.01); *B60N 2/0024* (2023.08); *B60N 2/0035* (2023.08); *B60N 2/0248* (2013.01); *B60N 2/16* (2013.01); *B60N 2/20* (2013.01); *B60R 1/04* (2013.01); *B60R 1/062* (2013.01); *B62D 1/187* (2013.01); *G06F 18/214* (2023.01); *G06V 20/593* (2022.01); *B60N 2210/18* (2023.08); *B60N 2210/24* (2023.08); *B60N 2210/30* (2023.08); *B60N 2210/40* (2023.08); *B60N 2220/30* (2023.08); *B60N 2230/20* (2023.08); *B62D 1/181* (2013.01)

(56) References Cited

U.S. PATENT DOCUMENTS

| | | | |
|---|---|---|---|
| 2010/0138178 A1* | 6/2010 | Paryani | G01R 31/3842 702/63 |
| 2012/0310376 A1 | 12/2012 | Krumm et al. | |
| 2016/0039426 A1* | 2/2016 | Ricci | H04L 67/12 701/1 |
| 2017/0262277 A1* | 9/2017 | Endo | G06F 8/658 |
| 2018/0075490 A1 | 3/2018 | Chintalapoodi et al. | |
| 2018/0194305 A1 | 7/2018 | Reed | |
| 2019/0286948 A1 | 9/2019 | Sathyanarayana et al. | |
| 2019/0319962 A1 | 10/2019 | Karunakaran et al. | |
| 2020/0311475 A1 | 10/2020 | el Kaliouby et al. | |

FOREIGN PATENT DOCUMENTS

| | | |
|---|---|---|
| JP | 2021017154 A | 2/2021 |
| JP | 2021060986 A | 4/2021 |
| WO | WO-2013006639 A1 * 1/2013 ........... A61B 5/0476 |

OTHER PUBLICATIONS

Google Machine Translation of German Patent Pub. No. DE102018212877B4 to Schon that was filed in 2018.*

Shi et al., "SenGuard: Passive User Identification on Smartphones Using Multiple Sensors," 2011 IEEE 7th International Conference on Wireless and Mobile Computing, Networking and Communications (WiMob), pp. 141-148, 2011.

Zhu et al., "Sensec: Mobile security through passive sensing," 2013 International Conference on Computing, Networking and Communications (ICNC), 2013, pp. 1128-1133.

Canfora et al., "Silent and Continuous Authentication in Mobile Environment.," in SECRYPT, 2016, pp. 97-108.

Bo et al., "Silentsense: silent user identification via touch and movement behavioral biometrics," in Proceedings of the 19th annual international conference on Mobile computing & networking, ACM, 2013, pp. 187-190.

Hallac et al., "Driver identification using automobile sensor data from a single turn," in IEEE 19th International Conference on Intelligent Transportation Systems (ITSC), IEEE, 2016, pp. 953-958.

Wang et al., "Driver Identification Leveraging Single-turn Behaviors via Mobile Devices," 2020 29th International Conference on Computer Communications and Networks (ICCCN), 2020, pp. 1-9.

Unknown, "Cloud computing," Last accessed on Aug. 4, 2021, 25 pages, found at https://en.wikipedia.org/wiki/Cloud_computing.

Unknown, "Connected car," Last accessed on Jun. 27, 2021, 13 pages, found at https://en.wikipedia.org/wiki/Connected_car#/Categories_of_applications.

Unknown, "Personal data," Last accessed on Aug. 12, 2021, 12 pages, found at https://en.wikipedia.org/wiki/Personal_data.

* cited by examiner

DETERMINING AN IDENTIFICATION OF AN OCCUPANT WITHIN A VEHICLE

TECHNICAL FIELD

The disclosed technologies are directed to determining an identification of an occupant within a vehicle.

BACKGROUND

A vehicle can be manufactured with several components that have a variety of settings that can be set to specific values so that the vehicle can be configured according to the needs of different occupants. Such components can include, for example, a position of a seat, a height of the seat, a degree to which the seat reclines, a position of a ventilation duct, a direction of the ventilation duct, a temperature of a heating system or an air conditioning system, a speed of a fan of a ventilation system, a position of a rearview mirror, a tilt angle of a steering wheel, a longitudinal position of the steering wheel, a volume of a speaker, a tuner of a radio, or the like. An ability to have the settings of such components have the specific values can allow such components to be personalized for a particular occupant.

SUMMARY

In an embodiment, a system for determining an identification of an occupant within a vehicle can include a processor, a communications interface, and a memory. The memory can store an information reception module, an identification prediction module, and an actuation module. The information reception module can include instructions that when executed by the processor cause the processor to receive, via the communications interface, from at least one sensor, and at a time when a source of a propulsion force for the vehicle is in an off state, at least one signal having information about at least one detectable characteristic associated with the occupant within the vehicle. The identification prediction module can include instructions that when executed by the processor cause the processor to produce, based on the information, a prediction of the identification of the occupant. The actuation module can include instructions that when executed by the processor cause the processor to cause, in response to a production of the prediction, a setting of a component of the vehicle to have a specific value.

In another embodiment, a method for determining an identification of an occupant within a vehicle can include receiving, by a processor, via a communications interface, from at least one sensor, and at a time when a source of a propulsion force for the vehicle is in an off state, at least one signal having information about at least one detectable characteristic associated with the occupant within the vehicle. The method can also include producing, by the processor and based on the information, a prediction of the identification of the occupant. The method can also include causing, by the processor and in response to a production of the prediction, a setting of a component of the vehicle to have a specific value.

In another embodiment, a non-transitory computer-readable medium for determining an identification of an occupant within a vehicle can include instructions that when executed by one or more processors cause the one or more processors to receive, via a communications interface, from at least one sensor, and at a time when a source of a propulsion force for a vehicle is in an off state, at least one signal having information about at least one detectable characteristic associated with an occupant within the vehicle. The non-transitory computer-readable medium can also include instructions that when executed by the one or more processors cause the one or more processors to produce, based on the information, a prediction of an identification of the occupant. The non-transitory computer-readable medium can also include instructions that when executed by the one or more processors cause the one or more processors to cause, in response to a production of the prediction, a setting of a component of the vehicle to have a specific value.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
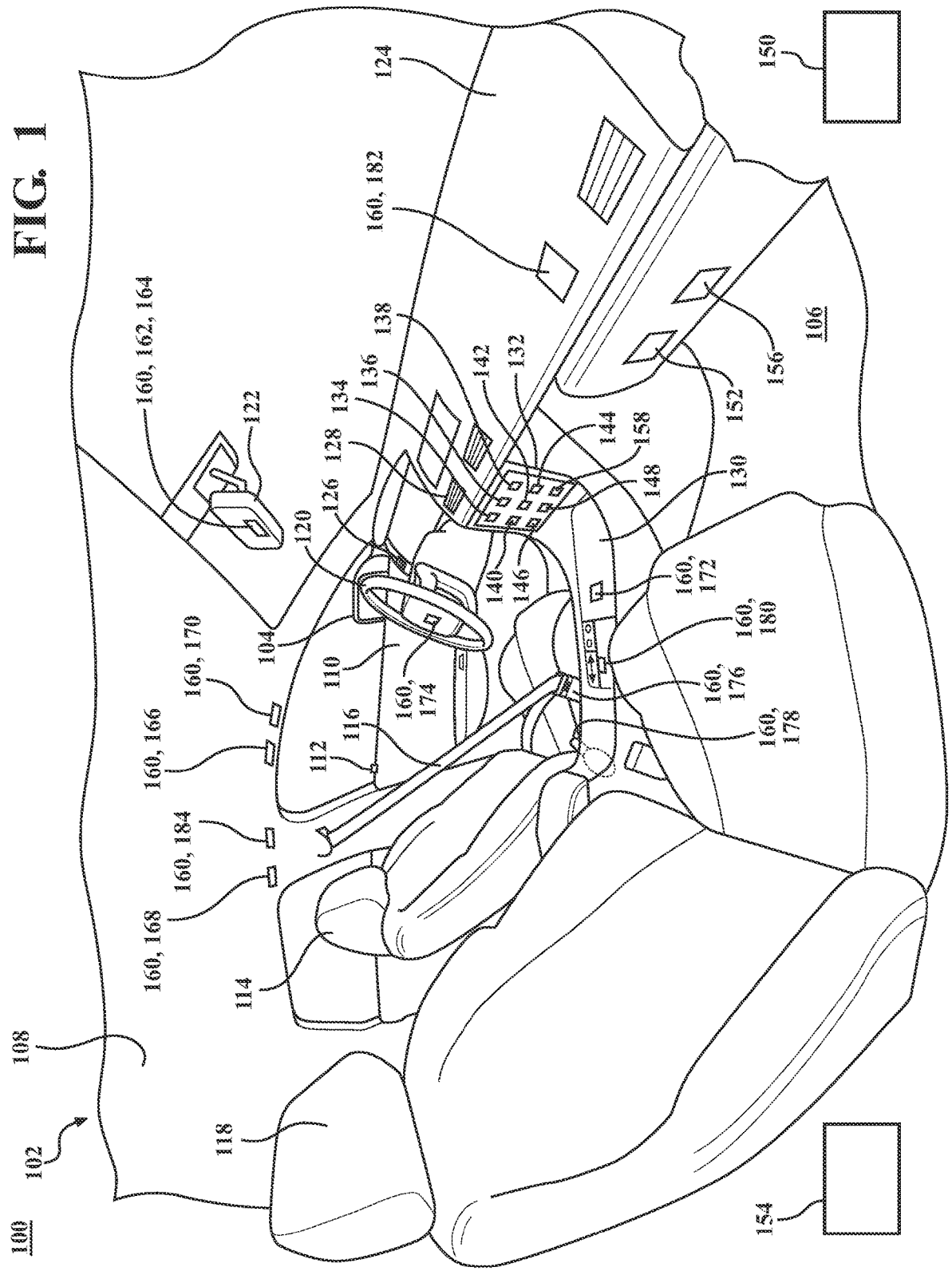
FIG. 1 includes a diagram that illustrates an example of an environment for determining an identification of an occupant within a vehicle, according to the disclosed technologies.

"Connected car" technologies can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies.

Originally developed to support applications related, for example, to vehicle safety, vehicle operations management, and vehicle breakdown management, connected car technologies can now also support applications related, for example, to navigation, driver assistance, and other technologies related to vehicle automation. More recently, connected car technologies can be used for applications related, for example, to a comfort of occupants of a vehicle, an assessment of a fitness of an operator of the vehicle, abilities to conduct commerce from the vehicle, and provision of entertainment to the occupants of the vehicle. Entertainment applications supported by connected car technologies can include, for example, an in-car entertainment system, a satellite radio, an Internet radio, a media streaming receiver, or the like. Some of these applications can also be associated with a variety of settings such that an ability to have the settings of such applications have specific values can allow such applications to be personalized for a particular occupant.

Additionally, some of these applications can be provided in a cloud computing environment. In a cloud computing environment, an entity (e.g., an occupant of a vehicle) can have an account though which a server can provide content associated with an application to a client device (e.g., the vehicle). To access such an account, the entity may be required to provide the server with personal data. For example, such personal data may include personally identifiable information (PII). However, wireless transmission of such personally identifiable information may be received by an entity engaged in identity theft. Moreover, because such personally identifiable information may be associated with the vehicle, wireless transmission of such personally identifiable information may be received by an entity engaged in automotive hacking. This may cause having malicious code transmitted to the vehicle. Such malicious code may allow the entity engaged in automotive hacking to commandeer a control of the vehicle such as a steering control, a brake control, or the like.

The disclosed technologies are directed to determining an identification of an occupant within a vehicle. At a time when a source of a propulsion force for the vehicle is in an off state, one or more signals, having information about one or more detectable characteristics associated with the occupant within the vehicle, can be received by a system, via a communications interface, from one or more sensors. For example, at least one of the one or more sensors can be disposed within an interior of the vehicle. For example, at least one of the one or more sensors can include a vision sensor, an imaging sensor, a microphone, an infrared sensor, a temperature sensor, a touch sensor, a proximity sensor, a contact sensor, a force sensor, a position sensor, a motion sensor, a scent sensor, or the like.

For example, the system can record the information and can determine an existence of a pattern, within a record of the information, correlated with the occupant. For example, an element, of the pattern, can be characterized by one or more of: (1) a measure of a duration of time during which at least one of the one or more sensors was caused to sense at least one of the one or more detectable characteristics, (2) a count of a number of instances in which the at least one of the one or more sensors was caused to sense before a time when the source of the propulsion force for the vehicle was changed from the off state to an on state, (3) a characteristic of a time (e.g., a time of a day, a day of a week, a season, etc.) during which the at least one of the one or more sensors was caused to sense the at least one of the one or more detectable characteristics, or (4) the like. For example, the information about the one or more detectable characteristics can exclude personal data. For example, such personal data can include personally identifiable information (PII) (e.g., face recognition information, iris recognition information, fingerprint recognition information, voice recognition information, or the like) or other information useful to an entity engaged in identity theft, automotive hacking, or both.

Based on the information about the one or more detectable characteristics, the system can produce a prediction of the identification of the occupant. The prediction of the identification of the occupant can be referred to as a pseudo-identification. In response to a production of the prediction, a setting of a component of the vehicle can be caused to have a specific value. In this manner, the setting of the component can be caused to have the specific value before the source of the propulsion force for the vehicle is changed from the off state to an on state or shortly after the source of the propulsion force for the vehicle was changed from the off state to the on state.

FIG. 1 includes a diagram that illustrates an example of an environment 100 for determining an identification of an occupant within a vehicle 102, according to the disclosed technologies. The vehicle 102 can include, for example, an outdoor rearview mirror 104 and an interior 106 of the vehicle 102.

The interior 106 can include, for example, a ceiling 108, a door 110, a lock 112 for the door 110, a first seat 114, a seatbelt 116, a second seat 118, a steering wheel 120, an indoor rearview mirror 122, a dashboard 124, a first ventilation duct 126, a second ventilation duct 128, a console tray 130, a central console 132, or the like.

The central console 132 can include, for example, a temperature control device 134 of a heating system or an air conditioning system, a speed control device 136 of a fan of a ventilation system, a volume control device 138 for a volume of a speaker, a tuner 140 of a radio, a control device 142 for an in-car entertainment system, a control device 144 for a satellite radio, a control device 146 for an Internet radio, a control device 148 for a media streaming receiver, or the like.

The vehicle 102 can include, for example, a source 150 of a propulsion force for the vehicle 102. The source 150 of the of the propulsion force for the vehicle 102 can be, for example, one or more of an internal combustion engine, a traction motor, or the like.

The vehicle 102 can include, for example, an electronic control unit 152.

The vehicle 102 can include, for example, an energy storage device 154. The energy storage device 154 can include one or more of a battery, a capacitor, a fuel cell system, or the like. The battery can be, for example, an electric-vehicle battery, an automotive battery, a cylindrical battery, a rectangular battery, a button cell, or the like. The battery can be, for example, a primary cell or a rechargeable battery.

The vehicle 102 can include, for example, a global navigation satellite system (GNNS) 156.

The vehicle 102 can include, for example, a short-range wireless technology device 158 (e.g., Bluetooth®). Such a device can be configured to interpret one or more short-range wireless technology profiles. Such profiles can include, for example, information about applications supported by the device, specify protocols that the device can use to communicate with one or more other devices, and include settings to parameterize and to control such communications. For some types of such devices, a device (e.g., the device 158) can be configured to have an ability to have a setting to have a specific value so that the device can be personalized for a particular user (e.g., an occupant of the vehicle 102).

The vehicle 102 can include, for example, one or more sensors 160. The one or more sensors 160 can include, for example, a vision sensor 162, an imaging sensor 164, a microphone 166, an infrared sensor 168, a temperature sensor 170, a touch sensor 172, a proximity sensor 174, a contact sensor 176, a force sensor 178, a position sensor 180, a motion sensor 182, a scent sensor 184, or the like.

For example, the vision sensor 162 and the imaging sensor 164 can be disposed on the indoor rearview mirror 122. For example, the microphone 166 and the temperature sensor 170 can be disposed on the ceiling 108. For example, the infrared sensor 168 and the scent sensor 184 can be disposed on the ceiling 108 near the first seat 114. For example, the touch sensor 172 can be disposed on the console tray 130. For example, the proximity sensor 174 can be disposed on the steering wheel 120. For example, the contact sensor 176 can be disposed on a latching device of the seatbelt 116. For example, the force sensor 178 can be disposed on a spring associated with a mechanism that controls a degree to which the first seat 114 reclines. For example, the position sensor 180 can be disposed on a mechanism that controls a position of the first seat 114. For example, the motion sensor 182 can be disposed on the dashboard 124 near the second seat 118.

Figure 2:
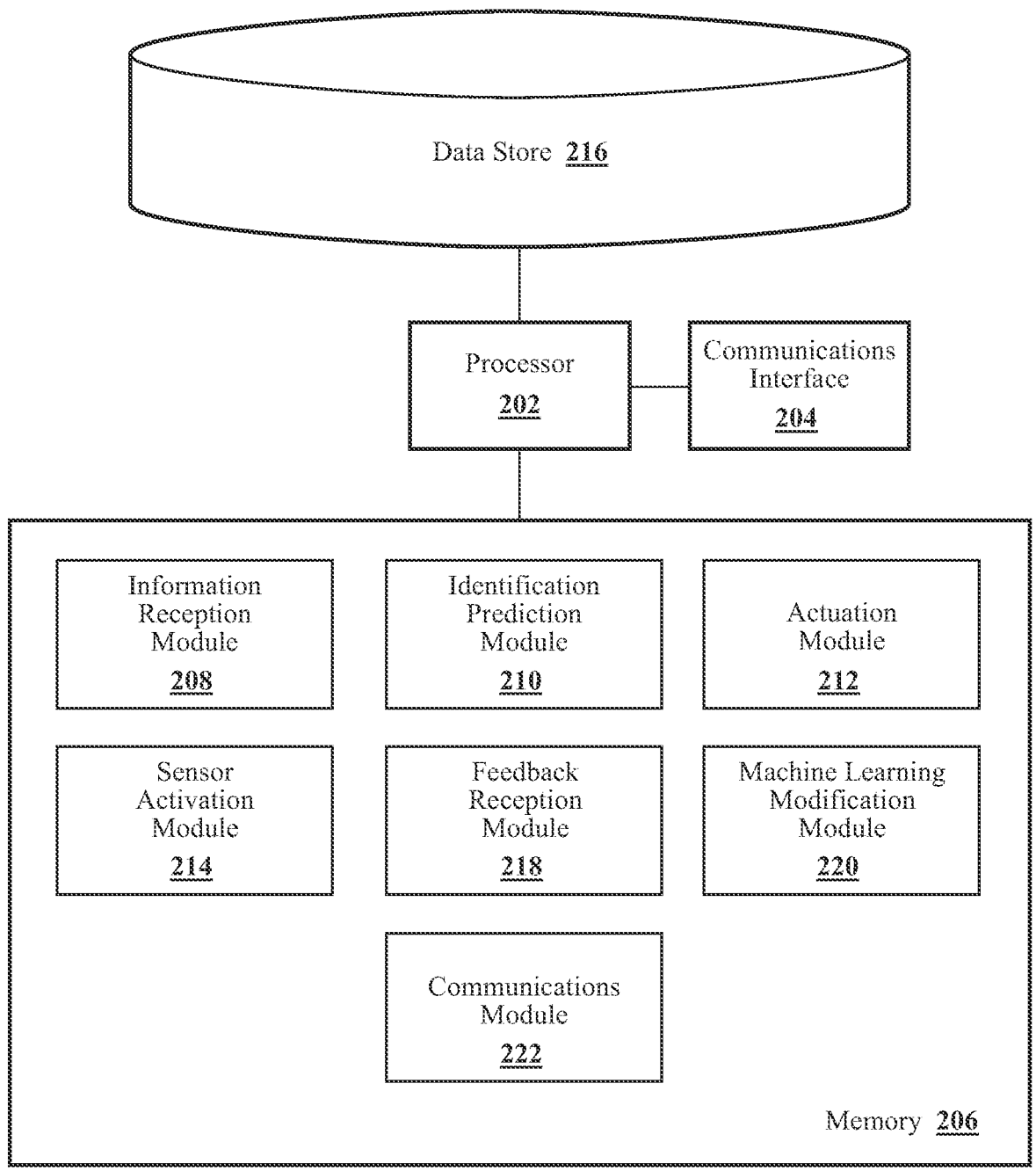
FIG. 2 includes a block diagram that illustrates an example of a system for determining an identification of an occupant within a vehicle, according to the disclosed technologies.

FIG. 2 includes a block diagram that illustrates an example of a system 200 for determining an identification of an occupant within a vehicle, according to the disclosed technologies. The system 200 can include, for example, a processor 202, a communications interface 204, and a memory 206. The communications interface 204 can be communicably coupled to the processor 202. The memory 206 can be communicably coupled to the processor 202. The memory 206 can store, for example, an information reception module 208, an identification prediction module 210, and an actuation module 212.

For example, an electronic control unit can include the system 200. For example, the electronic control unit can be coupled to one or more energy storage devices so that the electronic control unit can be configured to be operable at a time when a source of a propulsion force for the vehicle is in an off state. For example, the one or more energy storage devices can include one or more of a battery, a capacitor, a fuel cell system, or the like.

With reference to FIG. 1, for example, the vehicle can be the vehicle 102, the electronic control unit can be the electronic control unit 152, at least one of the one or more energy storage devices can be the energy storage device 154, and the source of the propulsion force for the vehicle can be the source 150 of the propulsion force for the vehicle 102.

Returning to FIG. 2, for example, the information reception module 208 can include instructions that function to control the processor 202 to receive, via the communications interface 204, from one or more sensors, and at the time when the source of the propulsion force for the vehicle is in the off state, one or more signals having information about one or more detectable characteristics associated with the occupant within the vehicle.

For example, at least one of the one or more sensors can be wireless.

For example, at least one of the one or more sensors can be disposed within an interior of the vehicle. With reference to FIG. 1, for example, at least one of the one or more sensors 160 can be disposed within the interior 106 of the vehicle 102.

Returning to FIG. 2, for example, at least one of the one or more sensors can include a vision sensor, an imaging sensor, a microphone, an infrared sensor, a temperature sensor, a touch sensor, a proximity sensor, a contact sensor, a force sensor, a position sensor, a motion sensor, a scent sensor, or the like. With reference to FIG. 1, for example, at least one of the one or more sensors 160 can include the vision sensor 162, the imaging sensor 164, the microphone 166, the infrared sensor 168, the temperature sensor 170, the touch sensor 172, the proximity sensor 174, the contact sensor 176, the force sensor 178, the position sensor 180, the motion sensor 182, or the scent sensor 184.

Returning to FIG. 2, for example, at least one of the one or more sensors can be coupled to one or more energy storage devices so that the at least one of the one or more sensors can be configured to be operable at the time when the source of the propulsion force for the vehicle is in the off state. For example, the one or more energy storage devices can include one or more of a battery, a capacitor, a fuel cell system, or the like. With reference to FIG. 1, for example, at least one of the one or more sensors 160 can be coupled to the energy storage device 154.

Alternatively, for example, a housing can be configured to contain at least one of the one or more sensors and at least one of the one or more energy storage devices.

Figure 3:
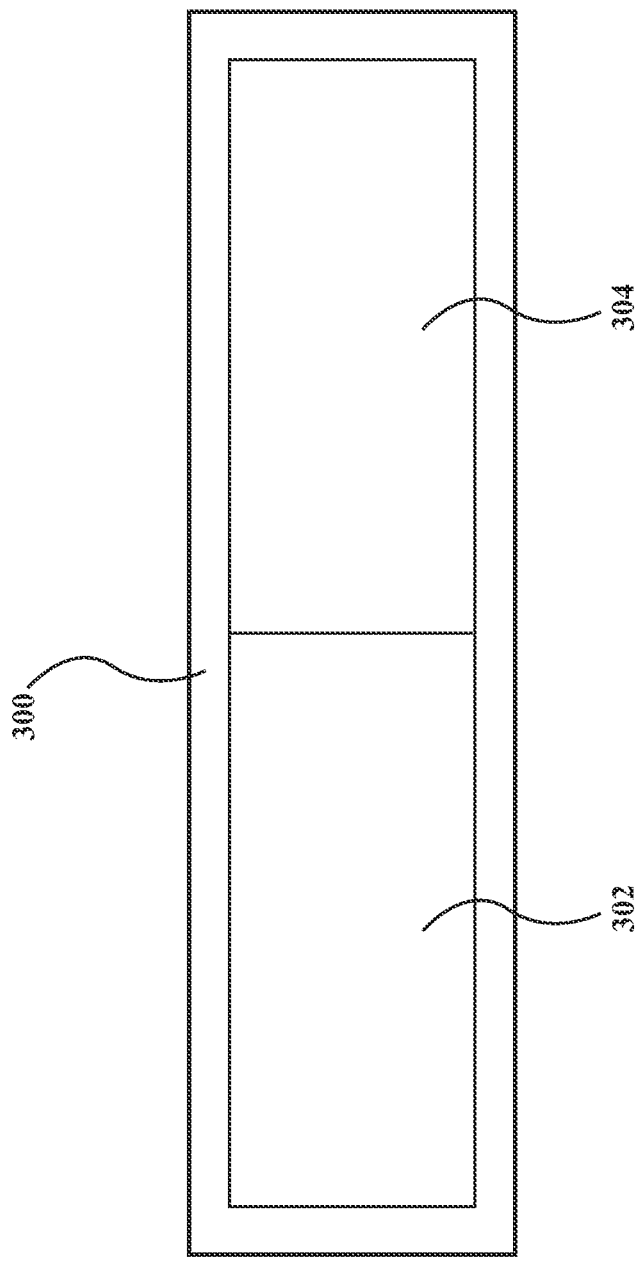
FIG. 3 includes a block diagram that illustrates an example of a housing configured to contain a sensor and an energy storage device, according to the disclosed technologies.

FIG. 3 includes a block diagram that illustrates an example of a housing 300 configured to contain a sensor 302 and an energy storage device 304, according to the disclosed technologies. For example, the sensor 302 can be any of the one or more sensors. With reference to FIG. 1, for example, any of the one or more sensors can be any of the one or more sensors 160. For example, the energy storage device 304 can include one or more of a battery or a capacitor. The battery can be, for example, a cylindrical battery, a rectangular battery, a button cell, or the like. The battery can be, for example, a primary cell or a rechargeable battery.

Returning to FIG. 2, in a configuration, the memory 206 can further store a sensor activation module 214. The sensor activation module 214 can include instructions that function to control the processor 202 to activate, in response to an existence of a condition, the one or more sensors to be configured to: (1) sense the one or more detectable characteristics and (2) produce the one or more signals. For example, the condition can include one or more of: (1) a door of the vehicle being opened, (2) a lock for the door being unlocked, (3) the occupant sitting in a seat of the vehicle, or (4) the like. With reference to FIG. 1, for example, the one or more sensors 160 can be activated, in response to one or more of: (1) the door 110 of the vehicle 102 being opened, (2) the lock 112 for the door 110 being unlocked, (3) the occupant sitting in the first seat 114 (or the second seat 118) of the vehicle 102, or (4) the like, to: (1) sense the one or more detectable characteristics and (2) produce the one or more signals.

Returning to FIG. 2, for example, the information about the one or more detectable characteristics can exclude personal data. For example, the personal data can include personally identifiable information (PII) (e.g., face recognition information, iris recognition information, fingerprint recognition information, voice recognition information, or the like) or other information useful to an entity engaged in identity theft, automotive hacking, or both.

For example, a first set of one or more detectable characteristics, associated with a first entity, can be different from a second set of one or more detectable characteristics associated with a second entity. For example: (1) the first entity can be Alice and (2) the second entity can be Bob.

For example, detectable characteristics associated with Alice can include: (1) a purse she often carries, (2) a high pitch of her voice, (3) an indoor parking garage at a location of her work that she likes to use, (4) her preference to wear a seatbelt, (5) her preference to recline a seat of a vehicle, (6) her preference to have a position of a seat of a vehicle at a most forward setting, (7) her preference to place her purse on a passenger seat when she operates a vehicle, (8) her preference to wear perfume, (9) her preference to use a short-range wireless technology device (e.g., Bluetooth®) installed on a vehicle, configured to support a cellular communications application, and with settings set to specific values personalized for Alice, and (10) having a position of an indoor rearview mirror at a setting preferred by Alice.

For example, detectable characteristics associated with Bob can include: (1) a low pitch of his voice, (2) his tall stature, (3) an outdoor parking lot at a location of his work that he likes to use, (4) his preference to put items in a console tray of a vehicle, (5) his preference to maintain a seat of a vehicle upright, (6) his preference to have a position of a seat of a vehicle at a setting halfway between a most forward setting and a most rearward setting, and (7) having a position of an indoor rearview mirror at a setting preferred by Bob.

For example, the identification prediction module 210 can include instructions that function to control the processor 202 to produce, based on the information about the one or more detectable characteristics, a prediction of the identification of the occupant.

With reference to FIGS. 1 and 2, for example, if the information about the one or more detectable characteristics includes one or more of information: (1) received from one or more of the vision sensor 162 or the imaging sensor 164, of an image of a purse, (2) received from the microphone 166, of a voice with a high pitch, (3) received from the temperature sensor 170, that a temperature of the vehicle 102 is at a moderate temperature, (4) received from the contact sensor 176, indicative that the seatbelt 116 is fastened, (5) received from the force sensor 178, indicative that the first seat 114 is reclined, (6) received from the position sensor 180, indicative that the position of the first seat 114 is at the most forward setting, (7) received from the motion sensor 182, indicative of one or more movements occurring in a vicinity of the second seat 118, (8) received from the scent sensor 184, indicative of a presence of a scent in the interior 106, or (9) that the position of the indoor rearview mirror 122 is at the setting preferred by Alice, then the identification prediction module 210 may produce the prediction that the identification of the occupant is Alice.

Likewise, for example, if the information about the one or more detectable characteristics includes one or more of information: (1) received from the microphone 166, of a voice with a low pitch, (2) received from the infrared sensor 168, indicative of heat radiating from a nearby object (e.g., a head), (3) received from the temperature sensor 170, that a temperature of the vehicle 102 is at an extreme temperature (e.g., hot or cold), (4) received from the touch sensor 172, indicative that an item is in the console tray 130, (5) received from the proximity sensor 174, indicative that an object (e.g., a torso) is near to the steering wheel 120, (6) received from the force sensor 178, indicative that the first seat 114 is upright, (7) received from the position sensor 180, indicative that the position of the first seat 114 is at the setting halfway between the most forward setting and the most rearward setting, or (8) that the position of the indoor rearview mirror 122 is at the setting preferred by Bob, then the identification prediction module 210 may produce the prediction that the identification of the occupant is Bob.

Returning to FIG. 2, for example, the actuation module 212 can include instructions that function to control the processor 202 to cause, in response to a production of the prediction, a setting of a component of the vehicle to have a specific value.

For example, the setting of the component can include one or more of a position of a seat, a height of the seat, a degree to which the seat reclines, a position of a ventilation duct, a direction of the ventilation duct, a temperature of a heating system or an air conditioning system, a speed of a fan of a ventilation system, a position of a rearview mirror, a tilt angle of a steering wheel, a longitudinal position of the steering wheel, a volume of a speaker, a tuner of a radio, a setting of an in-car entertainment system, a setting of a satellite radio, a setting of an Internet radio, a setting of a media streaming receiver, or the like.

With reference to FIG. 1, for example, the setting of the component can include one or more of the position of the first seat 114, the height of the first seat 114, the degree to which the first seat 114 reclines, the position of the first ventilation duct 126, the direction of the second ventilation duct 128, the temperature (set by the temperature control device 134) of the heating system or the air conditioning system, the speed (set by the speed control device 136) of the fan of the ventilation system, the position of the outdoor rearview mirror 104, the tilt angle of the steering wheel 120, the longitudinal position of the steering wheel 120, the volume (set by the volume control device 138) of the speaker, the tuner 140 of the radio, the setting (set by the control device 142) of the in-car entertainment system, the setting (set by the control device 144) of the satellite radio, the setting (set by the control device 146) of the Internet radio, or the setting (set by the control device 148) of the media streaming receiver (e.g., a Spotify® channel).

For example, a first specific value, for the setting of the component so that the component is personalized for a first occupant, can be different from a second specific value for the setting of the component so that the component is personalized for a second occupant. For example: (1) the first occupant can be Alice and (2) the second occupant can be Bob.

For example, for Alice, a specific value for the setting for: (1) the position of the first seat 114 can be the most forward setting, (2) the height of the first seat 114 can be a highest setting, (3) the degree to which the first seat 114 reclines can be fully reclined, (4) the position of the first ventilation duct 126 can be closed, (5) the direction of the second ventilation duct 128 can be straight, (6) the temperature (set by the temperature control device 134) of the heating system or the air conditioning system can be a warm temperature, (7) the speed (set by the speed control device 136) of the fan of the ventilation system can be a slow speed, (8) the position of the indoor rearview mirror 104 can correspond to the position of the indoor rearview mirror 122 preferred by Alice, (9) the tilt angle of the steering wheel 120 can be an angle at which the steering wheel 120 is at a low height, (10) the longitudinal position of the steering wheel 120 can be a long longitudinal position, (11) the volume (set by the volume control device 138) of the speaker can be set to a quiet volume, and (12) one or more of: (a) the tuner 140 of the radio, (b) the in-car entertainment system (set by the control device 142), (c) the satellite radio (set by the control device 144), (d) the Internet radio (set by the control device 146), or (e) the media streaming receiver (set by the control device 148) (e.g., a Spotify® channel) can be to receive country music.

Likewise, for example, for Bob, a specific value for the setting for: (1) the position of the first seat 114 can be the setting halfway between the most forward setting and the most rearward setting, (2) the height of the first seat 114 can be a lowest setting, (3) the degree to which the first seat 114 reclines can be fully upright, (4) the position of the first ventilation duct 126 can be opened, (5) the direction of the second ventilation duct 128 can be leftward, (6) the temperature (set by the temperature control device 134) of the heating system or the air conditioning system can be a cool temperature, (7) the speed (set by the speed control device 136) of the fan of the ventilation system can be a fast speed, (8) the position of the indoor rearview mirror 104 can correspond to the position of the indoor rearview mirror 122 preferred by Bob, (9) the tilt angle of the steering wheel 120 can be an angle at which the steering wheel 120 is at a high height, (10) the longitudinal position of the steering wheel 120 can be a short longitudinal position, (11) the volume (set by the volume control device 138) of the speaker can be set to a loud volume, and (12) one or more of: (a) the tuner 140 of the radio, (b) the in-car entertainment system (set by the control device 142), (c) the satellite radio (set by the control device 144), (d) the Internet radio (set by the control device 146), or (e) the media streaming receiver (set by the control device 148) (e.g., a Spotify® channel) can be to receive hip hop music.

Returning to FIG. 2, in a configuration, the system 200 can further include a data store 216. The instructions to produce the prediction of the identification of the occupant can include: (1) instructions to record, to the data store 216, the information about the one or more detectable characteristics and (2) instructions to determine an existence of a pattern, within a record of the information, correlated with the occupant.

For example, a first pattern, associated with the first occupant, can be different from a second pattern associated with the second occupant. For example: (1) the first occupant can be Alice and (2) the second occupant can be Bob.

With reference to FIG. 1, for example, the first pattern can include: (1) at a first time, information received from the scent sensor 184, indicative of the presence of a scent in the interior 106, (2) at a second time, information received from the motion sensor 182, indicative of one or more movements occurring in the vicinity of the second seat 118, (3) at a third time, information received from the position sensor 180, indicative that the position of the first seat 114 is at the most forward setting, and (4) at a fourth time, information received from the contact sensor 176, indicative that the seatbelt 116 is fastened.

Likewise, for example, the second pattern can include: (1) at a first time, information received from the touch sensor 172, indicative that an item is in the console tray 130, (2) at a second time, information received from the force sensor 178, indicative that the first seat 114 is upright, and (3) at a third time, information received from the touch sensor 172, indicative that another item is in the console tray 130.

In a first implementation of this configuration, an element, of the pattern, can be characterized by one or more of: (1) a measure of a duration of time during which at least one of the one or more sensors was caused to sense at least one of the one or more detectable characteristics, (2) a count of a number of instances in which the at least one of the one or more sensors was caused to sense before a time when the source of the propulsion force for the vehicle was changed from the off state to an on state, (3) a characteristic of a time (e.g., a time of a day, a day of a week, a season, etc.) during which the at least one of the one or more sensors was caused to sense the at least one of the one or more detectable characteristics, or (4) the like.

For example, in the first pattern, the element associated with the information received from the motion sensor 182, indicative of one or more movements occurring in the vicinity of the second seat 118, can have a duration of about fifteen seconds. For example, such an element can be associated with Alice routinely searching through her purse, which is on the second seat 118, for about fifteen seconds.

For example, in the second pattern, the count of the number of instances in which the touch sensor 172 was caused to sense, indicative that an item is in the console tray 130, can be at least two before the time when the source 150 of the propulsion force for the vehicle 102 was changed from the off state to the on state.

For example, in the first pattern, the element associated with the information received from the scent sensor 184, indicative of the presence of a scent in the interior 106, can be included in the first pattern only in the morning.

Additionally or alternatively, in a second implementation of this configuration, the instructions to determine the existence of the pattern can include instructions to determine, using a machine learning technique, the existence of the pattern.

Additionally, in the first implementation, the second implementation, or both: (1) the prediction of the identification can be associated with a confidence interval and (2) the instructions to cause the setting of the component of the vehicle to have the specific value can include instructions to cause, based on the confidence interval, the setting of the component of the vehicle to have the specific value.

For example, before the time when the source 150 of the propulsion force for the vehicle 102 is changed from the off state to the on state: (1) a single instance of a receipt of the information from the touch sensor 172 can be associated with a confidence level of 60 percent, (2) a count of a number of instances of receipts of the information from the touch sensor 172 being at least two can be associated with a confidence level of 70 percent, and (3) a pattern in which: (a) at a first time, information is received from the touch sensor 172, indicative that an item is in the console tray 130, (b) at a second time, information is received from the force sensor 178, indicative that the first seat 114 is upright, and (3) at a third time, information is received from the touch sensor 172, indicative that another item is in the console tray 130 (i.e., the second pattern) can be associated with a confidence level of 90 percent.

For example, the instructions to cause the setting of the one or more of: (a) the tuner 140 of the radio, (b) the in-car entertainment system (set by the control device 142), (c) the satellite radio (set by the control device 144), (d) the Internet radio (set by the control device 146), or (e) the media streaming receiver (set by the control device 148) (e.g., a Spotify® channel) to have the specific value to receive hip hop music can include instructions to cause, based on the confidence level being greater than 80 percent, the setting of the one or more of: (a) the tuner 140 of the radio, (b) the in-car entertainment system (set by the control device 142), (c) the satellite radio (set by the control device 144), (d) the Internet radio (set by the control device 146), or (e) the media streaming receiver (set by the control device 148) (e.g., a Spotify® channel) to have the specific value to receive hip hop music.

Returning to FIG. 2, additionally, in the second implementation, the memory 206 can further store a feedback reception module 218 and a machine learning modification module 220. The feedback reception module 218 can include instructions that function to control the processor 202 to receive, via the communications interface 204, a feedback signal associated with the component of the vehicle. The machine learning modification module 220 can include instructions that function to control the processor 202 to modify, based on information in the feedback signal, the machine learning technique to increase, during a future iteration, an accuracy of the prediction of the identification of the occupant. For example, an increase in the accuracy of the prediction of the identification of the occupant can be associated with a larger confidence interval.

With reference to FIGS. 1 and 2, for example, on a Monday morning in the fall, the second occupant (e.g., Bob) can cause a feedback signal, associated with the one or more of: (1) the tuner 140 of the radio, (2) the in-car entertainment system (set by the control device 142), (3) the satellite radio (set by the control device 144), (4) the Internet radio (set by the control device 146), or (5) the media streaming receiver (set by the control device 148) (e.g., a Spotify® channel), to be sent to the system 200. For example, in response to the system 200 setting the one or more of: (1) the tuner 140 of the radio, (2) the in-car entertainment system (set by the control device 142), (3) the satellite radio (set by the control device 144), (4) the Internet radio (set by the control device 146), or (5) the media streaming receiver (set by the control device 148) (e.g., a Spotify® channel) to have the specific value to receive, on a Monday morning in the fall, hip hop music, the second occupant (e.g., Bob) can change the setting of the one or more of: (1) the tuner 140 of the radio, (2) the in-car entertainment system (set by the control device 142), (3) the satellite radio (set by the control device 144), (4) the Internet radio (set by the control device 146), or (5) the media streaming receiver (set by the control device 148) (e.g., a Spotify® channel) to have a specific value to receive sports talk programming.

For example, the instructions to modify the machine learning technique can modify the machine learning technique so that, on a Monday morning in the fall, in response to a production of a prediction that the identification of the occupant is Bob, the system 200 can cause the setting of the one or more of: (1) the tuner 140 of the radio, (2) the in-car entertainment system (set by the control device 142), (3) the satellite radio (set by the control device 144), (4) the Internet radio (set by the control device 146), or (5) the media streaming receiver (set by the control device 148) (e.g., a Spotify® channel) to have the specific value to receive sports talk programming. For example, if, in response to the setting, on a Monday morning in the fall, of the one or more of: (1) the tuner 140 of the radio, (2) the in-car entertainment system (set by the control device 142), (3) the satellite radio (set by the control device 144), (4) the Internet radio (set by the control device 146), or (5) the media streaming receiver (set by the control device 148) (e.g., a Spotify® channel) to have the specific value to receive sports talk programming, Bob does not cause a feedback signal to be sent to the system, then the accuracy of the prediction of the identification of the occupant may have been increased and may be associated with a larger confidence interval (e.g., a confidence interval of 95 percent).

Returning to FIG. 2, in a configuration, the information reception module 208 can further include instructions that function to control the processor 202 to receive, via the communications interface 204 and at the time when the source of the propulsion force for the vehicle is in the off state, supplemental information. For example, the supplemental information can be one or more of: (1) a current location of the vehicle, (2) a profile of the occupant, or (3) the like. The instructions to produce the prediction of the identification of the occupant can include instructions to produce, based on the information and the supplemental information, the prediction of the identification of the occupant.

With reference to FIG. 1, for example, the supplemental information can be that the current location of the vehicle 102 is the indoor parking garage at the location where Alice works or the outdoor parking lot at the location where Bob works.

For example, the supplemental information can be an indication of an activation of the short-range wireless technology device 158 (e.g., Bluetooth®) installed on the vehicle 102, configured to support a cellular communications application, and with settings set to specific values personalized for Alice.

For example, the instructions to produce the prediction of the identification of the occupant can include instructions to produce, based on the information about the one or more detectable characteristics associated with Alice and one or more of: (1) the current location of the vehicle 102 being the indoor parking garage at the location where Alice works or (2) the activation of the short-range wireless technology device 158 (e.g., Bluetooth®) installed on the vehicle 102, configured to support a cellular communications application, and with settings set to specific values personalized for Alice, the prediction that the identification of the occupant is Alice.

Returning to FIG. 2, in a configuration, the memory 206 can further store a communications module 222. The communications module 222 can include instructions that function to control the processor 202 to send, in response to the prediction of the identification of the occupant being that the occupant is unrecognized and via the communications interface 204, a communication to a communications device (e.g., a cell phone). For example, the communications device can be associated with an entity associated with the vehicle. For example, the entity can be an entity that owns the vehicle, an entity that leases the vehicle, an entity that has authorization to operate the vehicle, an entity that sold the vehicle, an entity that manufactured the vehicle, an entity that provides security for the vehicle, or the like. The instructions to cause the setting of the component of the vehicle to have the specific value can include instructions to cause the setting of the component of the vehicle to maintain a current value.

With reference to FIGS. 1 and 2, although the disclosed technologies have been described with respect to determining an identification of an occupant of the first seat 114 (e.g., the seat of an operator (e.g., a driver)) of the vehicle 102, one of skill in the art understands, in light of the description herein, that the disclosed technologies can also be used to determine an occupant of the second seat 118 (e.g., the seat of a passenger) of the vehicle 102 or one or more occupants of one or more other seats (e.g., rear seats) (not illustrated) of the vehicle 102.

Figure 4A:
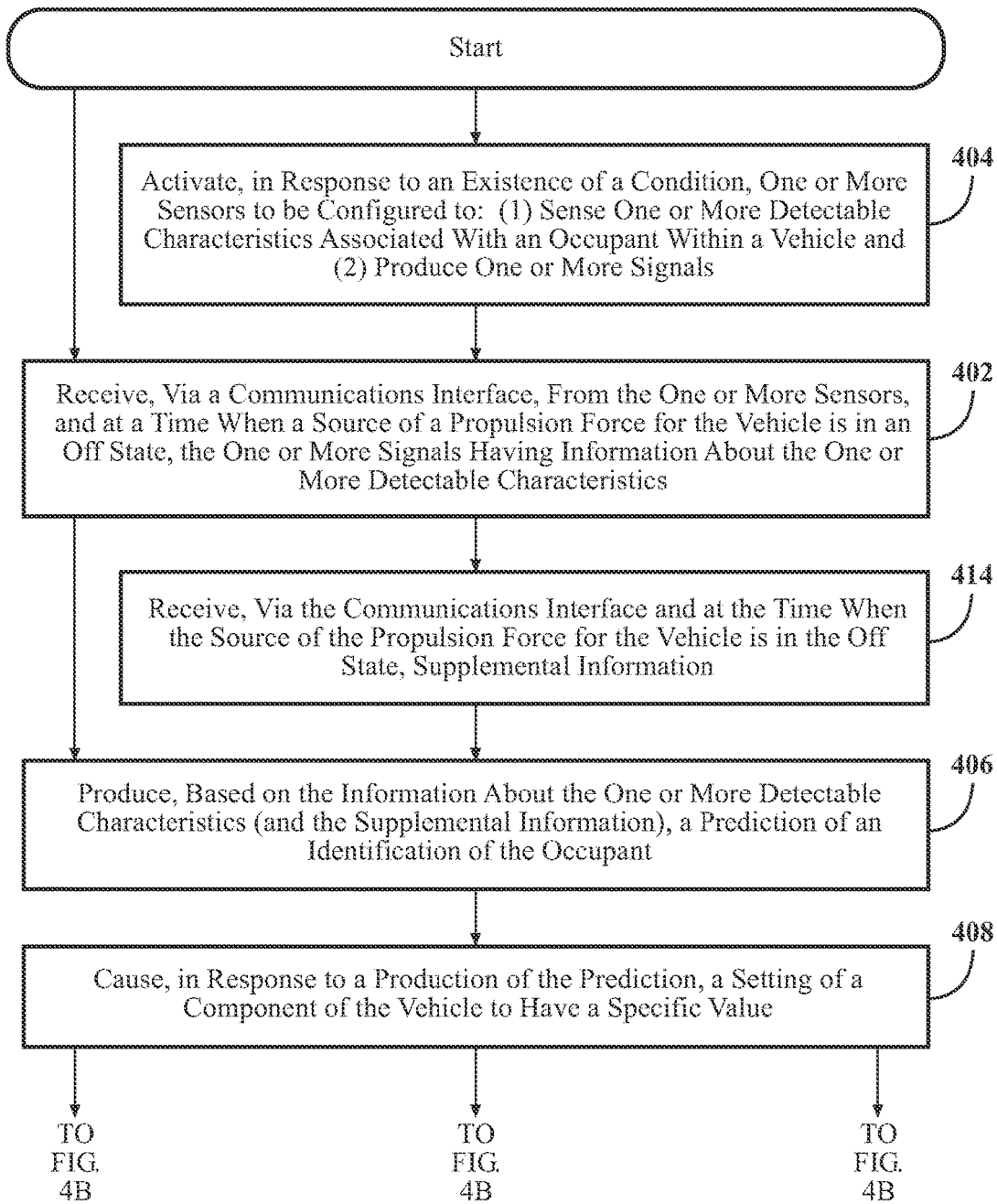
FIGS. 4A and 4B are a flow diagram that illustrates an example of a method that is associated with determining an identification of an occupant within a vehicle, according to the disclosed technologies.
Figure 4B:
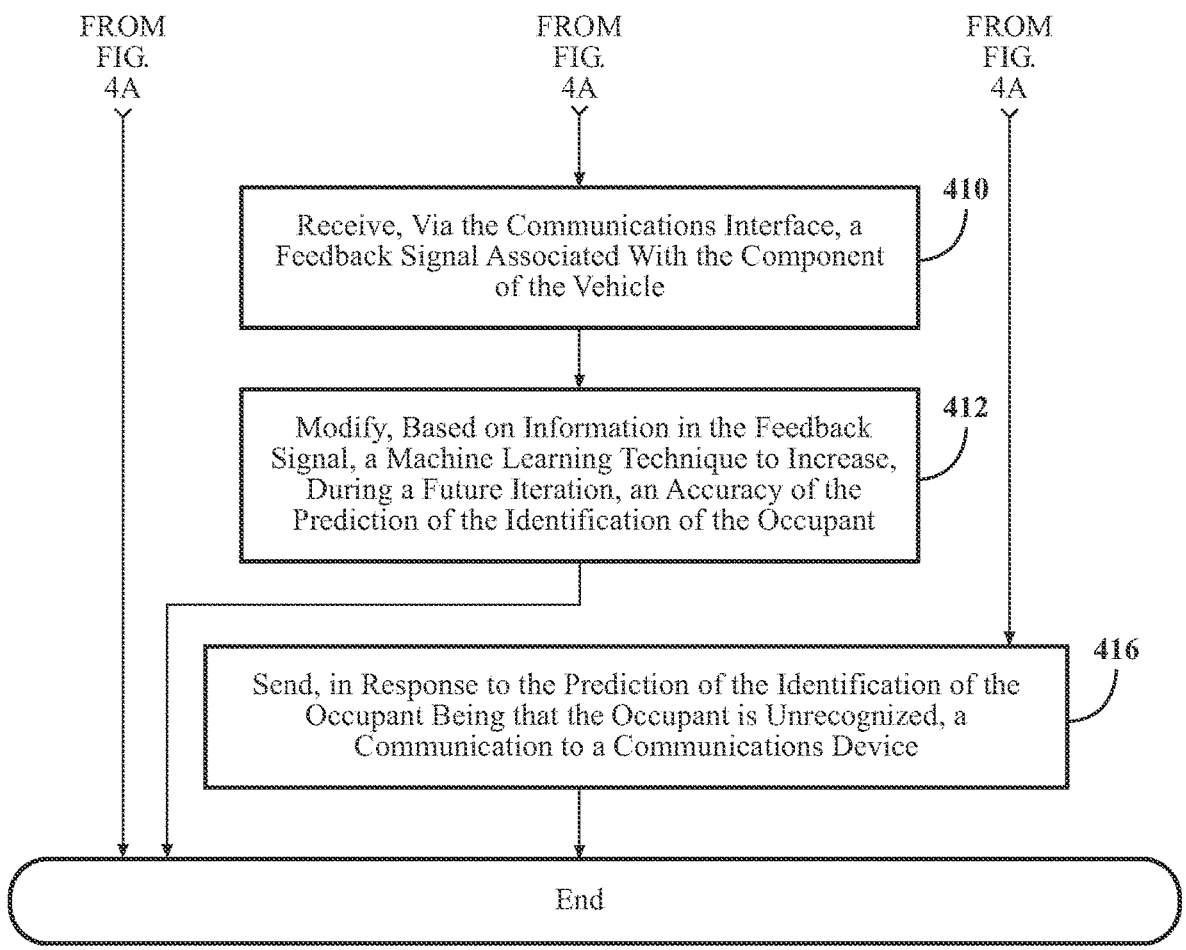

FIGS. 4A and 4B are a flow diagram that illustrates an example of a method 400 that is associated with determining an identification of an occupant within a vehicle, according to the disclosed technologies. The method 400 is described from the perspective of the system 200 illustrated in FIG. 2. Although the method 400 is described in combination with the system 200 illustrated in FIG. 2, one of skill in the art understands, in light of the description herein, that the method 400 is not limited to being implemented by the system 200 illustrated in FIG. 2. Rather, the system 200 illustrated in FIG. 2 is an example of a system that may be used to implement the method 400. Additionally, although the method 400 is illustrated as a generally serial process, various aspects of the method 400 may be able to be executed in parallel.

For example, an electronic control unit can include the processor 202 of the system 200. For example, the electronic control unit can be coupled to one or more energy storage devices so that the electronic control unit can be configured to be operable at a time when a source of a propulsion force for the vehicle is in an off state. For example, the one or more energy storage devices can include one or more of a battery, a capacitor, a fuel cell system, or the like.

In FIG. 4A, in the method 400, at an operation 402, for example, the information reception module 208 can receive, via the communications interface 204, from one or more sensors, and at the time when the source of the propulsion force for the vehicle is in the off state, one or more signals having information about one or more detectable characteristics associated with the occupant within the vehicle.

For example, at least one of the one or more sensors can be wireless.

For example, at least one of the one or more sensors can be disposed within an interior of the vehicle.

For example, at least one of the one or more sensors can include a vision sensor, an imaging sensor, a microphone, an infrared sensor, a temperature sensor, a touch sensor, a proximity sensor, a contact sensor, a force sensor, a position sensor, a motion sensor, a scent sensor, or the like.

For example, at least one of the one or more sensors can be coupled to one or more energy storage devices so that the at least one of the one or more sensors can be configured to be operable at the time when the source of the propulsion force for the vehicle is in the off state. For example, the one or more energy storage devices can include one or more of a battery, a capacitor, a fuel cell system, or the like.

Alternatively, for example, a housing can be configured to contain at least one of the one or more sensors and at least one of the one or more energy storage devices.

In a configuration, at an operation 404, for example, the sensor activation module 214 can activate, in response to an existence of a condition, the one or more sensors to be configured to: (1) sense the one or more detectable characteristics and (2) produce the one or more signals. For example, the condition can include one or more of: (1) a door of the vehicle being opened, (2) a lock for the door being unlocked, (3) the occupant sitting in a seat of the vehicle, or (4) the like.

For example, the information about the one or more detectable characteristics can exclude personal data. For example, the personal data can include personally identifiable information (PII) (e.g., face recognition information, iris recognition information, fingerprint recognition information, voice recognition information, or the like) or other information useful to an entity engaged in identity theft, automotive hacking, or both.

At an operation 406, for example, the identification prediction module 210 can produce, based on the information about the one or more detectable characteristics, a prediction of the identification of the occupant.

At an operation 408, for example, the actuation module 212 can cause, in response to a production of the prediction, a setting of a component of the vehicle to have a specific value.

For example, the setting of the component can include one or more of a position of a seat, a height of the seat, a degree to which the seat reclines, a position of a ventilation duct, a direction of the ventilation duct, a temperature of a heating system or an air conditioning system, a speed of a fan of a ventilation system, a position of a rearview mirror, a tilt angle of a steering wheel, a longitudinal position of the steering wheel, a volume of a speaker, a tuner of a radio, a setting of an in-car entertainment system, a setting of a satellite radio, a setting of an Internet radio, a setting of a media streaming receiver, or the like.

In a configuration, for example, the operation 406 can produce the prediction by recording, to the data store 216, the information about the one or more detectable characteristics and (2) determining an existence of a pattern, within a record of the information, correlated with the occupant.

In a first implementation of this configuration, an element, of the pattern, can be characterized by one or more of: (1) a measure of a duration of time during which at least one of the one or more sensors was caused to sense at least one of the one or more detectable characteristics, (2) a count of a number of instances in which the at least one of the one or more sensors was caused to sense before a time when the source of the propulsion force for the vehicle was changed from the off state to an on state, (3) a characteristic of a time (e.g., a time of a day, a day of a week, a season, etc.) during which the at least one of the one or more sensors was caused to sense the at least one of the one or more detectable characteristics, or (4) the like.

Additionally or alternatively, in a second implementation of this configuration, the operation 406 can determine the existence of the pattern can by determining, using a machine learning technique, the existence of the pattern.

Additionally, in the first implementation, the second implementation, or both: (1) the prediction of the identification can be associated with a confidence interval and (2) the operation 408 can cause the setting of the component of the vehicle to have the specific value by causing, based on the confidence interval, the setting of the component of the vehicle to have the specific value.

Additionally, in the second implementation, in FIG. 4B, in the method 400, at an operation 410, for example, the feedback reception module 218 can receive, via the communications interface 204, a feedback signal associated with the component of the vehicle.

Additionally, in the second implementation, at an operation 412, for example, the machine learning modification module 220 can modify, based on information in the feedback signal, the machine learning technique to increase, during a future iteration, an accuracy of the prediction of the identification of the occupant.

For example, an increase in the accuracy of the prediction of the identification of the occupant can be associated with a larger confidence interval.

In a configuration, at an operation 414, for example, the information reception module 208 can receive, via the communications interface 204 and at the time when the source of the propulsion force for the vehicle is in the off state, supplemental information. For example, the supplemental information can be one or more of: (1) a current location of the vehicle, (2) a profile of the occupant, or (3) the like. The operation 406 can produce, based on the information and the supplemental information, the prediction of the identification of the occupant.

In a configuration, at an operation 416, for example, the communications module 222 can send, in response to the prediction of the identification of the occupant being that the occupant is unrecognized and via the communications interface 204, a communication to a communications device (e.g., a cell phone). For example, the communications device can be associated with an entity associated with the vehicle. For example, the entity can be an entity that owns the vehicle, an entity that leases the vehicle, an entity that has authorization to operate the vehicle, an entity that sold the vehicle, an entity that manufactured the vehicle, an entity that provides security for the vehicle, or the like. The operation 408 can cause the setting of the component of the vehicle to have the specific value by causing the setting of the component of the vehicle to maintain a current value.

Figure 5:
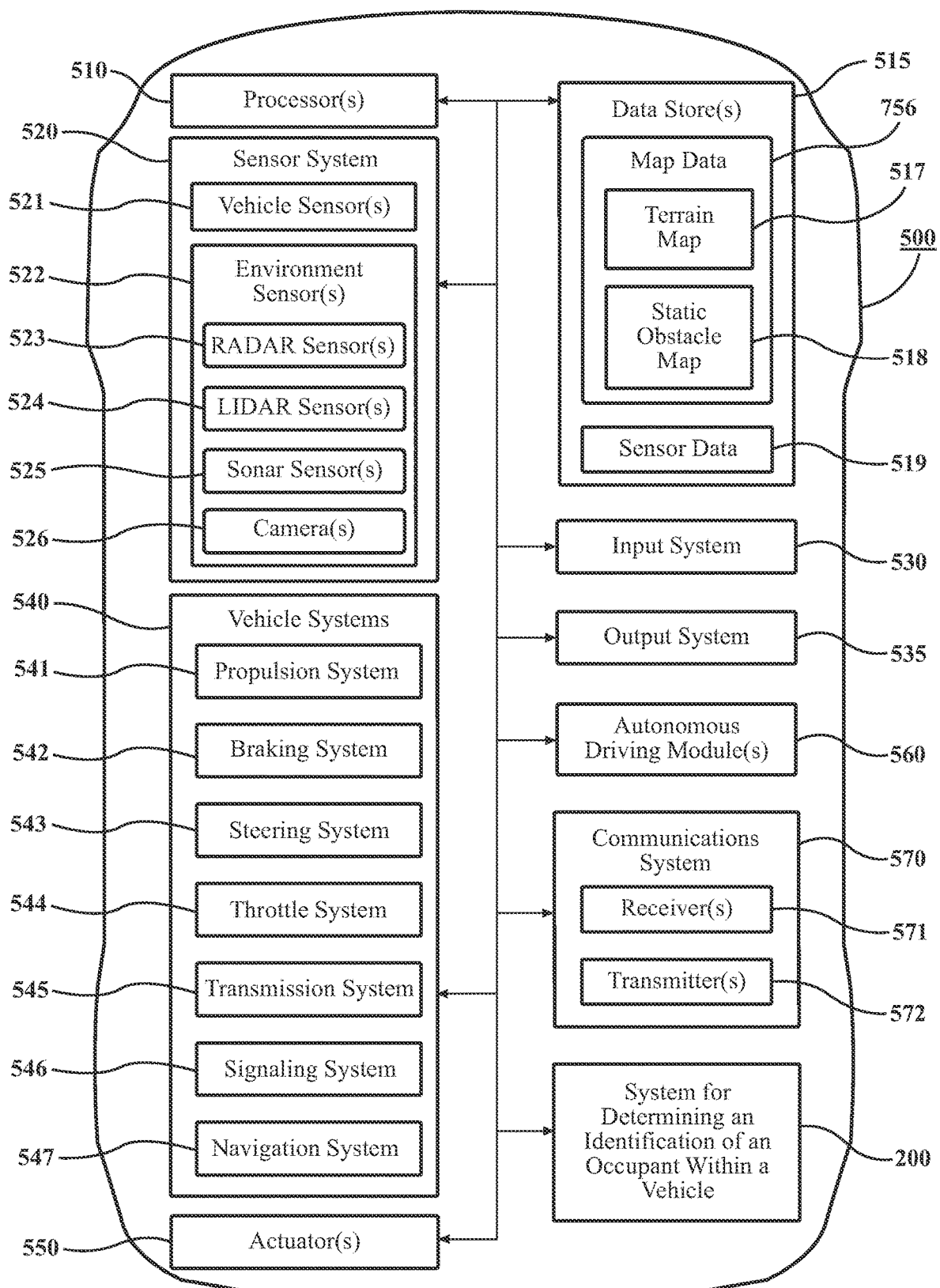
FIG. 5 includes a block diagram that illustrates an example of elements disposed on a vehicle, according to the disclosed technologies.

FIG. 5 includes a block diagram that illustrates an example of elements disposed on a vehicle 500, according to the disclosed technologies. As used herein, a "vehicle" can be any form of powered transport. In one or more implementations, the vehicle 500 can be an automobile. While arrangements described herein are with respect to automobiles, one of skill in the art understands, in light of the description herein, that embodiments are not limited to automobiles.

In some embodiments, the vehicle 500 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 500 is performed according to inputs received from a user (e.g., human driver). In one or more arrangements, the vehicle 500 can be a conventional vehicle that is configured to operate in only a manual mode.

In one or more embodiments, the vehicle 500 can be an automated vehicle. As used herein, "automated vehicle" can refer to a vehicle that operates in an automated mode. As used herein, "automated mode" can refer to navigating and/or maneuvering the vehicle 500 along a travel route using one or more computing systems to control the vehicle 500 with minimal or no input from a human driver. In one or more embodiments, the vehicle 500 can be highly automated or completely automated. In one embodiment, the vehicle 500 can be configured with one or more semi-automated operational modes in which one or more computing systems perform a portion of the navigation and/or maneuvering of the vehicle along a travel route, and a vehicle operator (i.e., driver) provides inputs to the vehicle 500 to perform a portion of the navigation and/or maneuvering of the vehicle 500 along a travel route.

For example, Standard J3016, Taxonomy and Definitions for Terms Related to Driving Automation Systems for On-Road Motor Vehicles, issued by the Society of Automotive Engineers (SAE) International on Jan. 16, 2014, and most recently revised on Jun. 15, 2018, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 500 can include various elements. The vehicle 500 can have any combination of the various elements illustrated in FIG. 5. In various embodiments, it may not be necessary for the vehicle 500 to include all of the elements illustrated in FIG. 5. Furthermore, the vehicle 500 can have elements in addition to those illustrated in FIG. 5. While the various elements are illustrated in FIG. 5 as being located within the vehicle 500, one or more of these elements can be located external to the vehicle 500. Furthermore, the elements illustrated may be physically separated by large distances. For example, as described, one or more components of the disclosed system can be implemented within the vehicle 500 while other components of the system can be implemented within a cloud-computing environment, as described below. For example, the elements can include one or more processors 510, one or more data stores 515, a sensor system 520, an input system 530, an output system 535, vehicle systems 540, one or more actuators 550, one or more automated driving modules 560, a communications system 570, and the system 200 for determining an identification of an occupant within a vehicle.

In one or more arrangements, the one or more processors 510 can be a main processor of the vehicle 500. For example, the one or more processors 510 can be an electronic control unit (ECU). For example, functions and/or operations of the processor 202 (illustrated in FIG. 2) can be realized by the one or more processors 510.

The one or more data stores 515 can store, for example, one or more types of data. For example, functions and/or operations of the memory 206, the data store 216 (illustrated in FIG. 2), or any combination thereof can be realized by the one or more data stores 515. The one or more data stores 515 can include volatile memory and/or non-volatile memory. Examples of suitable memory for the one or more data stores 515 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 515 can be a component of the one or more processors 510. Additionally or alternatively, the one or more data stores 515 can be operatively connected to the one or more processors 510 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 515 can store map data 516. The map data 516 can include maps of one or more geographic areas. In some instances, the map data 516 can include information or data on roads, traffic control devices, road markings, structures, features, and/or landmarks in the one or more geographic areas. The map data 516 can be in any suitable form. In some instances, the map data 516 can include aerial views of an area. In some instances, the map data 516 can include ground views of an area, including 360-degree ground views. The map data 516 can include measurements, dimensions, distances, and/or information for one or more items included in the map data 516 and/or relative to other items included in the map data 516. The map data 516 can include a digital map with information about road geometry. The map data 516 can be high quality and/or highly detailed.

In one or more arrangements, the map data 516 can include one or more terrain maps 517. The one or more terrain maps 517 can include information about the ground, terrain, roads, surfaces, and/or other features of one or more geographic areas. The one or more terrain maps 517 can include elevation data of the one or more geographic areas. The map data 516 can be high quality and/or highly detailed. The one or more terrain maps 517 can define one or more ground surfaces, which can include paved roads, unpaved roads, land, and other things that define a ground surface.

In one or more arrangements, the map data 516 can include one or more static obstacle maps 518. The one or more static obstacle maps 518 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 518 can have location data, size data, dimension data, material data, and/or other data associated with them. The one or more static obstacle maps 518 can include measurements, dimensions, distances, and/or information for one or more static obstacles. The one or more static obstacle maps 518 can be high quality and/or highly detailed. The one or more static obstacle maps 518 can be updated to reflect changes within a mapped area.

In one or more arrangements, the one or more data stores 515 can store sensor data 519. As used herein, "sensor data" can refer to any information about the sensors with which the vehicle 500 can be equipped including the capabilities of and other information about such sensors. The sensor data 519 can relate to one or more sensors of the sensor system 520. For example, in one or more arrangements, the sensor data 519 can include information about one or more lidar sensors 524 of the sensor system 520.

In some arrangements, at least a portion of the map data 516 and/or the sensor data 519 can be located in one or more data stores 515 that are located onboard the vehicle 500. Alternatively or additionally, at least a portion of the map data 516 and/or the sensor data 519 can be located in one or more data stores 515 that are located remotely from the vehicle 500.

The sensor system 520 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 520 includes a plurality of sensors, the sensors can work independently from each other. Alternatively, two or more of the sensors can work in combination with each other. In such a case, the two or more sensors can form a sensor network. The sensor system 520 and/or the one or more sensors can be operatively connected to the one or more processors 510, the one or more data stores 515, and/or another element of the vehicle 500 (including any of the elements illustrated in FIG. 5). For example, functions and/or operations of any of the one or more sensors 160 (illustrated in FIG. 1) can be realized by the sensor system 520. The sensor system 520 can acquire data of at least a portion of the external environment of the vehicle 500 (e.g., nearby vehicles). The sensor system 520 can include any suitable type of sensor. Various examples of different types of sensors are described herein. However, one of skill in the art understands that the embodiments are not limited to the particular sensors described herein.

The sensor system 520 can include one or more vehicle sensors 521. The one or more vehicle sensors 521 can detect, determine, and/or sense information about the vehicle 500 itself. In one or more arrangements, the one or more vehicle sensors 521 can be configured to detect and/or sense position and orientation changes of the vehicle 500 such as, for example, based on inertial acceleration. In one or more arrangements, the one or more vehicle sensors 521 can include one or more accelerometers, one or more gyroscopes, an inertial measurement unit (IMU), a dead-reckoning system, a global navigation satellite system (GNSS), a global positioning system (GPS), a navigation system 547, and/or other suitable sensors. The one or more vehicle sensors 521 can be configured to detect and/or sense one or more characteristics of the vehicle 500. In one or more arrangements, the one or more vehicle sensors 521 can include a speedometer to determine a current speed of the vehicle 500.

Alternatively or additionally, the sensor system 520 can include one or more environment sensors 522 configured to acquire and/or sense driving environment data. As used herein, "driving environment data" can include data or information about the external environment in which a vehicle is located or one or more portions thereof. For example, the one or more environment sensors 522 can be configured to detect, quantify, and/or sense obstacles in at least a portion of the external environment of the vehicle 500 and/or information/data about such obstacles. Such obstacles may be stationary objects and/or dynamic objects. The one or more environment sensors 522 can be configured to detect, measure, quantify, and/or sense other things in the external environment of the vehicle 500 such as, for example, lane markers, signs, traffic lights, traffic signs, lane lines, crosswalks, curbs proximate the vehicle 500, off-road objects, etc.

Various examples of sensors of the sensor system 520 are described herein. The example sensors may be part of the one or more vehicle sensors 521 and/or the one or more environment sensors 522. However, one of skill in the art understands that the embodiments are not limited to the particular sensors described.

In one or more arrangements, the one or more environment sensors 522 can include one or more radar sensors 523, one or more lidar sensors 524, one or more sonar sensors 525, and/or one or more cameras 526. In one or more arrangements, the one or more cameras 526 can be one or more high dynamic range (HDR) cameras or one or more infrared (IR) cameras. For example, the one or more cameras 526 can be used to record a reality of a state of an item of information that can appear in the digital map.

The input system 530 can include any device, component, system, element, arrangement, or groups thereof that enable information/data to be entered into a machine. The input system 530 can receive an input from a vehicle passenger (e.g., a driver or a passenger). The output system 535 can include any device, component, system, element, arrangement, or groups thereof that enable information/data to be presented to a vehicle passenger (e.g., a driver or a passenger).

Various examples of the one or more vehicle systems 540 are illustrated in FIG. 5. However, one of skill in the art understands that the vehicle 500 can include more, fewer, or different vehicle systems. Although particular vehicle systems can be separately defined, each or any of the systems or portions thereof may be otherwise combined or segregated via hardware and/or software within the vehicle 500. For example, the one or more vehicle systems 540 can include a propulsion system 541, a braking system 542, a steering system 543, a throttle system 544, a transmission system 545, a signaling system 546, and/or the navigation system 547. Each of these systems can include one or more devices, components, and/or a combination thereof, now known or later developed.

The navigation system 547 can include one or more devices, applications, and/or combinations thereof, now known or later developed, configured to determine the geographic location of the vehicle 500 and/or to determine a travel route for the vehicle 500. The navigation system 547 can include one or more mapping applications to determine a travel route for the vehicle 500. The navigation system 547 can include a global positioning system, a local positioning system, a geolocation system, and/or a combination thereof.

The one or more actuators 550 can be any element or combination of elements operable to modify, adjust, and/or alter one or more of the vehicle systems 540 or components thereof responsive to receiving signals or other inputs from the one or more processors 510 and/or the one or more automated driving modules 560. Any suitable actuator can be used. For example, the one or more actuators 550 can include motors, pneumatic actuators, hydraulic pistons, relays, solenoids, and/or piezoelectric actuators.

The one or more processors 510 and/or the one or more automated driving modules 560 can be operatively connected to communicate with the various vehicle systems 540 and/or individual components thereof. For example, the one or more processors 510 and/or the one or more automated driving modules 560 can be in communication to send and/or receive information from the various vehicle systems 540 to control the movement, speed, maneuvering, heading, direction, etc. of the vehicle 500. The one or more processors 510 and/or the one or more automated driving modules 560 may control some or all of these vehicle systems 540 and, thus, may be partially or fully automated.

The one or more processors 510 and/or the one or more automated driving modules 560 may be operable to control the navigation and/or maneuvering of the vehicle 500 by controlling one or more of the vehicle systems 540 and/or components thereof. For example, when operating in an automated mode, the one or more processors 510 and/or the one or more automated driving modules 560 can control the direction and/or speed of the vehicle 500. The one or more processors 510 and/or the one or more automated driving modules 560 can cause the vehicle 500 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner. The communications system 570 can include one or more receivers 571 and/or one or more transmitters 572. The communications system 570 can receive and transmit one or more messages through one or more wireless communications channels. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 570 can include "connected car" technology. "Connected car" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies.

The vehicle 500 can include one or more modules, at least some of which are described herein. The modules can be implemented as computer-readable program code that, when executed by the one or more processors 510, implement one or more of the various processes described herein. One or more of the modules can be a component of the one or more processors 510. Alternatively or additionally, one or more of the modules can be executed on and/or distributed among other processing systems to which the one or more processors 510 can be operatively connected. The modules can include instructions (e.g., program logic) executable by the one or more processors 510. Alternatively or additionally, the one or more data store 515 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 500 can include one or more automated driving modules 560. The one or more automated driving modules 560 can be configured to receive data from the sensor system 520 and/or any other type of system capable of capturing information relating to the vehicle 500 and/or the external environment of the vehicle 500. In one or more arrangements, the one or more automated driving modules 560 can use such data to generate one or more driving scene models. The one or more automated driving modules 560 can determine position and velocity of the vehicle 500. The one or more automated driving modules 560 can determine the location of obstacles, obstacles, or other environmental features including traffic signs, trees, shrubs, neighboring vehicles, pedestrians, etc.

The one or more automated driving modules 560 can be configured to receive and/or determine location information for obstacles within the external environment of the vehicle 500 for use by the one or more processors 510 and/or one or more of the modules described herein to estimate position and orientation of the vehicle 500, vehicle position in global coordinates based on signals from a plurality of satellites, or any other data and/or signals that could be used to determine the current state of the vehicle 500 or determine the position of the vehicle 500 with respect to its environment for use in either creating a map or determining the position of the vehicle 500 in respect to map data.

The one or more automated driving modules 560 can be configured to determine one or more travel paths, current automated driving maneuvers for the vehicle 500, future automated driving maneuvers and/or modifications to current automated driving maneuvers based on data acquired by the sensor system 520, driving scene models, and/or data from any other suitable source such as determinations from the sensor data 519. As used herein, "driving maneuver" can refer to one or more actions that affect the movement of a vehicle. Examples of driving maneuvers include: accelerating, decelerating, braking, turning, moving in a lateral direction of the vehicle 500, changing travel lanes, merging into a travel lane, and/or reversing, just to name a few possibilities. The one or more automated driving modules 560 can be configured to implement determined driving maneuvers. The one or more automated driving modules 560 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 560 can be configured to execute various vehicle functions and/or to transmit data to, receive data from, interact with, and/or control the vehicle 500 or one or more systems thereof (e.g., one or more of vehicle systems 540). For example, functions and/or operations of an automotive navigation system can be realized by the one or more automated driving modules 560.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-3, 4A, 4B, and 5, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:
1. A system, comprising:
a processor;
a data store;
a communications interface; and
a memory storing:
an information reception module including instructions that when executed by the processor cause the processor to receive, via the communications interface, from at least one sensor, and at a time when a source of a propulsion force for a vehicle is in an off state, at least one signal having information about at least one detectable characteristic associated with an occupant within the vehicle;
an identification prediction module including instructions that when executed by the processor cause the processor to produce, based on the information, a prediction of an identification of the occupant by:
recording, to the data store, the information, and
determining an existence of a pattern, within a record of the information, correlated with the occupant, wherein the pattern includes, at a first time, a first detectable characteristic and, at a second time, a second detectable characteristic, and
wherein an element, of the pattern, is characterized by at least one of:
a measure of a duration of time during which at least one of the at least one sensor was caused to sense at least one of the at least one detectable characteristic,
a count of a number of instances in which the at least one of the at least one sensor was caused to sense before a time when the source of the propulsion force for the vehicle was changed from the off state to an on state, the count being greater than one, or
a characteristic of a time during which the at least one of the at least one sensor was caused to sense the at least one of the at least one detectable characteristic, the characteristic of the time being at least one of a time of a day, a day of a week, or a season; and
an actuation module including instructions that when executed by the processor cause the processor to cause, in response to a production of the prediction of the identification of the occupant, a setting of a component of the vehicle to have a specific value, wherein the setting of the component comprises at least one of a position of a seat, a height of the seat, a degree to which the seat reclines, a position of a ventilation duct, a direction of the ventilation duct, a temperature of a heating system or an air conditioning system, a speed of a fan of a ventilation system, a position of a rearview mirror, a tilt angle of a steering wheel, a longitudinal position of the steering wheel, a volume of a speaker, a tuner of a radio, a setting of an in-car entertainment system, a setting of a satellite radio, a setting of an Internet radio, or a setting of a media streaming receiver.

2. The system of claim 1, wherein:
an electronic control unit comprises the system, and
the electronic control unit is coupled to at least one energy storage device so that the electronic control unit is configured to be operable at the time when the source of the propulsion force for the vehicle is in the off state.

3. The system of claim 1, wherein at least one of the at least one sensor comprises a vision sensor, an imaging sensor, a microphone, an infrared sensor, a temperature sensor, a touch sensor, a proximity sensor, a contact sensor, a force sensor, a position sensor, a motion sensor, or a scent sensor.

4. The system of claim 1, wherein at least one of the at least one sensor is coupled to at least one energy storage device so that the at least one of the at least one sensor is configured to be operable at the time when the source of the propulsion force for the vehicle is in the off state.

5. The system of claim 4, wherein a housing is configured to contain at least one of the at least one sensor and at least one of the at least one energy storage device.

6. The system of claim 1, wherein the memory further stores a sensor activation module including instructions that when executed by the processor cause the processor to activate, in response to an existence of a condition, the at least one sensor to be configured to:
sense the at least one detectable characteristic; and
produce the at least one signal.

7. The system of claim 6, wherein the condition comprises at least one of:
a door of the vehicle being opened,
a lock for the door being unlocked, or
the occupant sitting in a seat of the vehicle.

8. The system of claim 1, wherein the instructions to determine the existence of the pattern include instructions to determine, using a machine learning technique, the existence of the pattern.

9. The system of claim 8, wherein:
the prediction of the identification is associated with a confidence interval, and
the instructions to cause the setting of the component of the vehicle to have the specific value include instructions to cause, based on the confidence interval, the setting of the component of the vehicle to have the specific value.

10. The system of claim 9, wherein the memory further stores:
a feedback reception module including instructions that when executed by the processor cause the processor to receive, via the communications interface, a feedback signal associated with the component of the vehicle; and
a machine learning modification module including instructions that when executed by the processor cause the processor to modify, based on information in the feedback signal, the machine learning technique to increase, during a future iteration, an accuracy of the prediction of the identification of the occupant.

11. The system of claim 1, wherein:
the information reception module further includes instructions that when executed by the processor cause the processor to receive, via the communications interface and at the time when the source of the propulsion force for the vehicle is in the off state, supplemental information, the supplemental information being of at least one of:
a current location of the vehicle, or
a profile of the occupant, and
the instructions to produce the prediction of the identification of the occupant include instructions to produce, based on the information and the supplemental information, the prediction of the identification of the occupant.

12. The system of claim 1, wherein:
the memory further stores a communications module including instructions that when executed by the processor cause the processor to send, in response to the prediction of the identification of the occupant being that the occupant is unrecognized and via the communications interface, a communication to a communications device, and
the instructions to cause the setting of the component of the vehicle to have the specific value include instructions to cause the setting of the component of the vehicle to maintain a current value.

13. A method, comprising:
receiving, by a processor, via a communications interface, from at least one sensor, and at a time when a source of a propulsion force for a vehicle is in an off state, at least one signal having information about at least one detectable characteristic associated with an occupant within the vehicle;
producing, by the processor and based on the information, a prediction of an identification of the occupant by:
recording the information, and
determining an existence of a pattern, within a record of the information, correlated with the occupant,
wherein the pattern includes, at a first time, a first detectable characteristic and, at a second time, a second detectable characteristic, and
wherein an element, of the pattern, is characterized by at least one of:
a measure of a duration of time during which at least one of the at least one sensor was caused to sense at least one of the at least one detectable characteristic,
a count of a number of instances in which the at least one of the at least one sensor was caused to sense before a time when the source of the propulsion force for the vehicle was changed from the off state to an on state, the count being greater than one, or
a characteristic of a time during which the at least one of the at least one sensor was caused to sense the at least one of the at least one detectable characteristic, the characteristic of the time being at least one of a time of a day, a day of a week, or a season; and
causing, by the processor and in response to a production of the prediction of the identification of the occupant, a setting of a component of the vehicle to have a specific value, wherein the setting of the component comprises at least one of a position of a seat, a height of the seat, a degree to which the seat reclines, a position of a ventilation duct, a direction of the ventilation duct, a temperature of a heating system or an air conditioning system, a speed of a fan of a ventilation system, a position of a rearview mirror, a tilt angle of a steering wheel, a longitudinal position of the steering wheel, a volume of a speaker, a tuner of a radio, a setting of an in-car entertainment system, a setting of a satellite radio, a setting of an Internet radio, or a setting of a media streaming receiver.

14. The method of claim 13, wherein at least one of the at least one sensor is wireless.

15. The method of claim 13, wherein the information about the at least one detectable characteristic excludes personal data.

16. The method of claim 15, wherein the personal data include personally identifiable information.

17. A non-transitory computer-readable medium for determining an identification of an occupant within a vehicle, the non-transitory computer-readable medium including instructions that when executed by one or more processors cause the one or more processors to:
receive, via a communications interface, from at least one sensor, and at a time when a source of a propulsion force for a vehicle is in an off state, at least one signal having information about at least one detectable characteristic associated with an occupant within the vehicle;
produce, based on the information, a prediction of an identification of the occupant by:
recording the information, and
determining an existence of a pattern, within a record of the information, correlated with the occupant,
wherein the pattern includes, at a first time, a first detectable characteristic and, at a second time, a second detectable characteristic, and wherein an element, of the pattern, is characterized by at least one of:
  a measure of a duration of time during which at least one of the at least one sensor was caused to sense at least one of the at least one detectable characteristic,
  a count of a number of instances in which the at least one of the at least one sensor was caused to sense before a time when the source of the propulsion force for the vehicle was changed from the off state to an on state, the count being greater than one, or
  a characteristic of a time during which the at least one of the at least one sensor was caused to sense the at least one of the at least one detectable characteristic, the characteristic of the time being at least one of a time of a day, a day of a week, or a season; and
cause, in response to a production of the prediction of the identification of the occupant, a setting of a component of the vehicle to have a specific value, wherein the setting of the component comprises at least one of a position of a seat, a height of the seat, a degree to which the seat reclines, a position of a ventilation duct, a direction of the ventilation duct, a temperature of a heating system or an air conditioning system, a speed of a fan of a ventilation system, a position of a rearview mirror, a tilt angle of a steering wheel, a longitudinal position of the steering wheel, a volume of a speaker, a tuner of a radio, a setting of an in-car entertainment system, a setting of a satellite radio, a setting of an Internet radio, or a setting of a media streaming receiver.

18. A system, comprising:
a processor; and
a memory storing instructions that cause the processor to:
  receive detectable characteristics of an occupant;
  determine, from the detectable characteristics, a pattern, correlated with the occupant, that includes, at a first time, a first detectable characteristic and, at a second time, a second detectable characteristic;
  produce, based on the pattern, an identification prediction of the occupant; and
  cause, in response to a production of the identification prediction, a setting of a component of a vehicle to have a specific value, wherein the setting comprises at least one of a position of a seat, a height of the seat, a degree to which the seat reclines, a position of a ventilation duct, a direction of the ventilation duct, a temperature of a heating system or an air conditioning system, a speed of a fan of a ventilation system, a position of a rearview mirror, a tilt angle of a steering wheel, a longitudinal position of the steering wheel, a volume of a speaker, a tuner of a radio, a setting of an in-car entertainment system, a setting of a satellite radio, a setting of an Internet radio, or a setting of a media streaming receiver.

* * * * *